United States Patent [19]

Finlayson et al.

[11] 4,287,086
[45] Sep. 1, 1981

[54] VISCOUS ORGANIC SYSTEMS CONTAINING AN ORGANOPHILIC CLAY GELLANT WITHOUT AN ORGANIC DISPERSANT THEREFOR

[75] Inventors: Claude M. Finlayson; John W. Jordan, both of Houston, Tex.

[73] Assignee: NL Industries, Inc., New York, N.Y.

[21] Appl. No.: 749,323

[22] Filed: Dec. 10, 1976

Related U.S. Application Data

[63] Continuation-in-part of Ser. No. 573,967, May 2, 1975, abandoned.

[51] Int. Cl.$^3$ .................. B01J 13/00; C10M 1/10; C10M 5/04
[52] U.S. Cl. .................. 252/316; 252/8.5 P; 252/8.55 R; 252/28; 252/309; 260/448 C
[58] Field of Search .............. 252/316, 309 B, 8.5 P, 252/28; 260/448 C

[56] References Cited

U.S. PATENT DOCUMENTS

| | | | |
|---|---|---|---|
| 2,531,427 | 11/1950 | Hauser | 252/316 X |
| 2,859,234 | 11/1958 | Clem | 252/28 X |
| 2,966,506 | 12/1960 | Jordan | 260/448 C |
| 3,133,072 | 5/1964 | Shibe, Jr. et al. | 252/316 X |
| 3,537,994 | 11/1970 | House | 252/28 X |

*Primary Examiner*—Richard D. Lovering
*Attorney, Agent, or Firm*—Gary M. Nath

[57] ABSTRACT

The viscosity of liquid organic systems is increased by adding thereto an organophilic clay gellant which is the reaction product of a smectite clay having a cation exchange capacity of at least 0.75 milliequivalents per gram and from 1.00 to less than 1.20 milliequivalents per gram of clay of a methyl benzyl dialkyl ammonium salt, wherein the two alkyl groups independently contain from 16 to 18 carbon atoms, and from 0% to 1% water in the absence of a polar organic dispersant for the gellant.

12 Claims, No Drawings

4,287,086

VISCOUS ORGANIC SYSTEMS CONTAINING AN ORGANOPHILIC CLAY GELLANT WITHOUT AN ORGANIC DISPERSANT THEREFOR

This application is a continuation-in-part of copending application Ser. No. 573,967 filed May 2, 1975, and now abandoned.

FIELD OF THE INVENTION

This invention relates to organophilic organic-clay complexes which are dispersible in organic liquids to form a gel therein. Depending on the composition of the gel, such gels may be useful as lubricating greases, oil base muds, oil base packer fluids, paint-varnish-lacquer removers, paints, foundry molding sand binders and the like.

DESCRIPTION OF THE PRIOR ART

It is well known that organic compounds which contain a cation will react under favorable conditions by ion-exchange with clays which contain a negative layer-lattice and exchangeable cations to form organophilic organic-clay products. If the organic cation contains at least one alkyl group containing at least 10 carbon atoms, then such organoclays have the property of swelling in certain organic liquids. See for example Hauser U.S. Pat. No. 2,531,427 and Jordan U.S. Pat. No. 2,966,506, both incorporated herein by reference, and the book "Clay Mineralogy", 2nd Edition, 1968 by Ralph E. Grim (McGraw-Hill Book Co., Inc.), particularly Chapter 10, Clay-Mineral-Organic Reactions; pp. 356-368-Ionic Reactions, Smectite; and pp. 392-401-Organophilic Clay-Mineral Complexes.

Since the commercial introduction of these organoclays in the early 1950's (trademarked BENTONE), it has become well known that in order to gain the maximum gelling (thickening) efficiency from these organoclays a low molecular weight polar organic material must be added to the composition. Such polar materials have been variously called dispersants, dispersion aids, solvating agents, dispersion agents and the like. See for example the following U.S. Pat. Nos. O'Halloran 2,677,661; McCarthy et. al. 2,704,276; Stratton 2,833,720; Stratton 2,879,229; Stansfield et. al. 3,294,683.

An excellent review of the variables which affect the gelation of lubricating oils by organoclays to form greases is given by C. J. Boner in his book "Manufacture and Application of LUBRICATING GREASES", 1954 (Reinhold Publishing Corp.), pp. 724-748-Clay Base Thickeners. Articles which disclose the use of organophilic clay gellants and polar organic dispersants as viscosifiers in organic systems are the following: (1) "Some Aspects of BENTONE Greases", R. E. Fariss, NLGI Spokesman, January, 1957, pp. 10-16; (2) "A Modified Clay Thickener For Lubricating Fluids", R. E. Fariss, NLGI Spokesman, February, 1960, pp. 432-437; (3) "A Modified Clay Thickener For Corrosion Resistant Greases", R. F. House, NLGI Spokesman, April, 1966, pp. 11-17; (4) "The Gelation Of Hydrocarbons By Montmorillonite Organic Complexes", W. T. Granquist and James L. McAtee, Jr., J. Colloid Science 18, 409-420 (1963); (5) "Flow Properties Of Dispersions of An Organo-Montmorillonite In Organic Media", J. V. Kennedy and W. T. Granquist, NLGI Spokesman, August, 1965, pp. 138-145; (6) "Some Fundamental Aspects Of The Permeability Of Organo-Montmorillonite Greases", J. L. McAtee, Jr. and Liangkoa Chen, NLGI Spokesman, June, 1968, pp. 89-95; (7) "Fundamental Aspects Of The Permeability And Gel Strength of Inorganic Thickened Greases", J. L. McAtee, Jr. and J. P. Freeman, NLGI Spokesman, September, 1968, pp. 200-205; (8) "Study Of Dispersants In The Preparation of Inorganic Thickened Greases", J. L. McAtee, Jr., NLGI Spokesman, May, 1969, pp. 52-60; (9) "Extent of Dispersion of an Organo-Clay Complex in Oil-An Infrared Method", F. W. Schaefer, A. C. Wright and W. T. Granquist, NLGI Spokesman, March, 1971, pp. 418-423.

It is disclosed in Burton U.S. Pat. No. 3,753,906 that water is a dispersant when used in a heated grease preparation process. Emond et. al., however, in U.S. Pat. No. 3,654,171 disclose that water is not a dispersant in grease preparation processes conducted at a temperature ranging from ambient to about 220° F. These polar materials may also affect properties other than the viscosity or gel strength of the organic gels, such as mechanical stability, thixotropy, and storage stability.

The most efficient and accepted polar materials for use as dispersants have been found to be low molecular weight alcohols and ketones, particularly methanol and acetone. These dispersants, however, have very low flash points and require the use of flame-proof apparatus. Higher boiling, high flash point dispersants may be used but these are less efficient and often produce gels having poor secondary properties such as mechanical stability or storage stability.

House U.S. Pat. No. 3,537,994 discloses the use of organophilic clays prepared from methyl benzyl dihexadecyl ammonium compounds as gellants for lubricating greases. All of the examples in this patent disclose the use of a polar organic dispersant for the organophilic clay in the preparation of the greases.

Accordingly, there is a need for a process of increasing the viscosity of organic systems with organophilic clay gellants in the absence of polar organic dispersants for the gellant.

SUMMARY OF THE INVENTION

We have now found that an organophilic clay, which is the reaction product of a smectite clay having a cation exchange capacity of at least 0.75 milliequivalents per gram (meq./gm.) and a methyl benzyl dialkyl ammonium salt, wherein the two alkyl groups contain from 16 to 18 carbon atoms, has enhanced dispersibility in organic systems, provided that the milliequivalent ratio (ME ratio) of this ammonium compound to the clay is within the range from 100 to less than 120 milliequivalents per 100 grams of clay, such that no polar organic dispersant is needed to gel such organic systems at ambient temperatures, although minor amounts of water, such as 0.05-1.0%, may increase the gelling efficiency of this organophilic clay.

DESCRIPTION OF THE PREFERRED EMBODIMENTS OF THE INVENTION

The clays used to prepare the organoclay thickeners of this invention are smectite clays which have a cation exchange capacity of at least 75 milliequivalents per 100 grams of clay. Particularly desirable types of clay are the naturally occurring Wyoming variety of swelling bentonite and like clays, and hectorite, a swelling magnesium-lithium silicate.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively the clay can be mixed with water and a soluble sodium compound such as sodium carbonate, sodium hydroxide, etc., and shearing the mixture such as with a pugmill or extruder.

Smectite clays prepared synthetically by either a pneumatolytic or, preferably, a hydrothermal synthesis process can also be used to prepare these novel organic-clay complexes. Representative of such clays are the following:

Montmorillonite

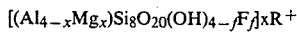

where $0.55 \leq x \leq 1.10$, $f \leq 4$ and R is selected from the group consisting of Na, Li, NH$_4$, and mixtures thereof;

bentonite

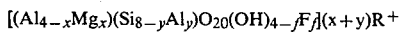

where $0 < x < 1.10$, $0 < y < 1.10$, $0.55 \leq (x+y) \leq 1.10$, $f \leq 4$ and R is selected from the group consisting of Na, Li, NH$_4$ and mixtures thereof;

beidellite

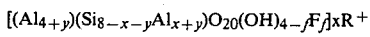

where $0.55 \leq x \leq 1.10$, $0 \leq y \leq 0.44$, $f \leq 4$ and R is selected from the group consisting of Na, Li, NH$_4$ and mixtures thereof;

hectorite

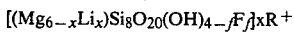

where $0.57 \leq x \leq 1.15$, $f \leq 4$ and R is selected from the group consisting of Na, Li, NH$_4$, and mixtures thereof;

saponite

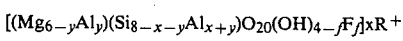

where $0.58 \leq x \leq 1.18$, $0 \leq y \leq 0.66$, $f \leq 4$ and R is selected from the group consisting of Na, Li, NH$_4$, and mixtures thereof;

stevensite

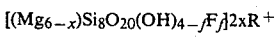

where $0.28 \leq x \leq 0.57$, $f \leq 4$ and R is selected from the group consisting of Na, Li, NH$_4$, and mixtures thereof.

These clays may be synthesized hydrothermally by forming an aqueous reaction mixture in the form of a slurry containing mixed hydrous oxides or hydroxides of the desired metals with or without, as the case may be, sodium (or alternate exchangeable cation or mixture thereof) fluoride in the proportions defined by the above formulas and the preselected values of x, y, and f for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C. depending on the particular smectite being synthesized, and the optimum time can readily be determined by pilot trials. Representative hydrothermal processes for preparing synthetic smectites are described in the following U.S. Pat. Nos., incorporated herein by reference: Granquist 3,252,757; Neumann 3,586,478; Orlemann 3,666,407; Neumann 3,671,190; Hickson 3,844,978; Hickson 3,844,979; Granquist 3,852,405; Granquist 3,855,147.

The cation exchange capacity of the smectite clay can be determined by the well-known ammonium acetate method.

The organic compounds useful in the practice of this invention are quaternary ammonium salts containing one methyl radical, one benzyl radical, and two alkyl radicals each independently containing from 16 to 18 carbon atoms. Preferably the alkyl radicals are hydrogenated tallow radicals, i.e., $C_n H_{2n+1}$ where n is 16 or 18. The salt anion is preferably selected from the group consisting of chloride and bromide, and mixtures thereof, and is more preferably chloride, although other anions such as acetate, hydroxide, nitrite, etc., may be present in the quaternary ammonium salt to neutralize the quaternary ammonium cation. The methyl benzyl dialkyl ammonium salt may be represented by the formula:

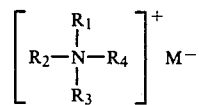

where $R_1 = CH_3$, $R_2 = C_6H_5CH_2$, $R_3$ and $R_4$ are alkyl groups containing from 16 to 18 carbon atoms; and where $M^-$ is preferably selected from the group consisting of $Cl^-$, $Br^-$, $NO_2^-$, $OH^-$, $C_2H_3O_2^-$, and mixtures thereof.

The preferred quaternary amine for use in the practice of this invention is methyl benzyl dihydrogenated tallow ammonium chloride. Each hydrogenated tallow radical contains sixteen or eighteen carbon atoms and, by virtue of the hydrogenation, are alkyl radicals.

The alkyl radicals may be derived from other natural oils including various vegetable oils, such as corn oil, soybean oil, cottonseed oil, castor oil, and the like, and various animal oils or fats. The alkyl radicals may be petrochemically derived such as from alpha olefins.

Many processes are known to prepare the methyl benzyl dialkyl ammonium salts used in the present invention. Generally one skilled in the art would prepare a dialkyl secondary amine, for example, by the hydrogenation of nitriles, see Young U.S. Pat. No. 2,355,356; form the methyl dialkyl tertiary amine by reductive alkylation using formaldehyde as the source of the methyl radical, see Shapiro et. al. U.S. Pat. No. 3,136,819; and thereafter form the quaternary amine halide by adding benzyl chloride or benzyl bromide to the tertiary amine, see Shapiro et. al. U.S. Pat. No. 2,775,617.

The organo-clays of this invention can be prepared by admixing the clay, quaternary ammonium compound and water together, preferably at a temperature within the range from 100° F. to 180° F., more preferably 140°

F. to 170° F. for a period of time sufficient for the organic compound to coat the clay particles, followed by filtering, washing, drying and grinding. In using the organo-clays in emulsions the drying and grinding steps may be eliminated. When admixing the clay, quaternary ammonium compound and water together in such concentrations that a slurry is not formed, then the filtration and washing steps can be eliminated.

Preferably the clay is dispersed in water at a concentration from about 3% to 7%, the slurry centrifuged to remove non-clay impurities, the slurry agitated and heated to a temperature in the range from 140° F. to 170° F., the quaternary amine salt added in the desired ME ratio, preferably as a liquid in isopropanol or dispersed in water, and the agitation continued to effect the reaction.

The amount of the methyl benzyl dialkyl ammonium salt added to the clay for purposes of this invention must be sufficient to impart to the organophilic clay the enhanced dispersion characteristics desired. The ME ratio is defined as the number of milliequivalents of the organic compound in the organoclay per 100 grams of clay, 100% active clay basis. The organophilic clays of this invention must have a ME ratio from 100 to less than 120. At lower ME ratios the organophilic clays produced are not effective gellants in the process of this invention even though they may be good gellants when dispersed in a conventional manner with polar organic dispersants, etc. At higher ME ratios the organophilic clays are poor gellants. However, it will be recognized that the preferred ME ratio, within the range from 100 to less than 120, will vary depending on the characteristics of the organic system to be gelled by the organophilic clay.

A sample convenient test has been devised to illustrate the enhanced dispersion characteristics of the organophilic clays utilized in this invention and the results obtained in utilizing the process of this invention. The test is conducted by mixing the organophilic clay with a conventionally refined low VI oil at a concentration of 4.5% by weight for 0.5 minutes using a Fisher Scientific Co. DYNA-MIX mixer operating at 1800 rpm. The viscosity of the oil-gellant mixture is then obtained. Longer mixing times may be undertaken. Thereafter 0.12% water is added to the mixture and the mixing is continued. The viscosity of the mixture is periodically determined, generally after 6–9 minutes. A Brookfield RVT Viscometer is used to obtain the viscosity although any suitable viscometer can be used. Under these low shear conditions in the absence of a polar organic dispersion aid the much greater dispersibility of the organophilic clays of this invention as compared to previously known organophilic clays can be readily demonstrated. Generally, the organophilic clays prepared from approximately 100% active clay (containing essentially no impurities) will produce a gel having a 10 rpm Brookfield viscosity of at least 20,000 centipoises when dispersed at a concentration of 4.5% in a hydrocarbon oil having a viscosity index less than about 20 with a mixer operating at 1800 rpm for 6 minutes in the presence of 0.1–0.5% added water.

The process of this invention can be carried out at elevated temperatures. However, it is preferred that the process be conducted at temperatures less than 85° C., more preferably at ambient temperatures.

The following examples illustrate the process of this invention and the benefits afforded through the utilization thereof, but are not to be construed as limiting the invention except as discussed herein.

The smectite clays used are hectorite and Wyoming bentonite. The hectorite clay was slurried in water and centrifuged to remove essentially all of the non-clay impurities. The Wyoming bentonite clay was slurried in water, centrifuged to remove essentially all of the non-clay impurities, and ion-exchanged to the sodium form by passing the slurry through a bed of cation exchange resin in the sodium form. Several samples of methyl benzyl dihydrogenated tallow ammonium chloride supplied by ENENCO, Inc. were used to prepare the organoclays in the examples. The molecular weight of these samples ranged from 619 to 644 and the percent activity, in isopropanol, varied from 60% to 81.5%. The conventionally refined oil and the solvent refined oils had the following properties:

|  | Conventionally Refined | Solvent Refined |
|---|---|---|
| Gravity, °API @ 60 F. | 20 | 30.4 |
| Viscosity, SUS @ 100 F. | 500 | 400 |
| Viscosity, SUS @ 210 F. | 53 | 58 |
| Viscosity Index | 12 | 98 |
| Index of Refraction | 1.5085 | 1.4811 |
| Flash Point, °F. | 390 | 460 |
| Pour Point, °F. | −5 | 5 |

EXAMPLE 1

The organoclays listed in Table A were prepared by heating the clay slurry to a temperature within the range from 150° F. to 170° F., adding while stirring the clay slurry, the indicated amount of the indicated quaternary ammonium chloride which had been previously melted for convenience in handling, and continuing the stirring for approximately 45 minutes, followed by filtering, washing, drying at 140° F., and grinding.

These organoclays were evaluated in the conventionally refined oil in the ease of dispersion test described which dramatically indicates the improved ease of dispersion of these thickeners as compared to similar organoclay thickeners.

The data in Table A indicate the sharp increase in the ease of dispersion of organoclays prepared from methyl benzyl dihydrogenated tallow ammonium chloride and these smectite clays when the amount of this quaternary ammonium compound was in the range from 100 to about 120 milliequivalents per 100 grams of clay. The data also illustrates the much superior dispersion characteristics of the inventive organoclays as compared with organoclays prepared from somewhat similar but different quaternary ammonium compounds.

TABLE A

| Organophilic Clay | | | 4.5% Organophilic Clay 10 rpm Brookfield Viscosity, cp. | | |
|---|---|---|---|---|---|
| | | ME | 0% Water | 0.12% Water | |
| Quaternary Ammonium Chloride | Clay | Ratio | 0.5 Minutes | 6 Minutes | 9 Minutes |
| Methyl benzyl dihydrogenatedtallow | Hectorite | 87.5 | 480 | —(2) | 1,000 |

TABLE A-continued

| Organophilic Clay | | | 4.5% Organophilic Clay 10 rpm Brookfield Viscosity, cp. | | |
|---|---|---|---|---|---|
| | | ME | 0% Water | 0.12% Water | |
| Quaternary Ammonium Chloride | Clay | Ratio | 0.5 Minutes | 6 Minutes | 9 Minutes |
| Methyl benzyl dihydrogenatedtallow | Hectorite | 92.4 | 480 | — | 2,000 |
| Methyl benzyl dihydrogenatedtallow | Hectorite | 97.2 | 560 | — | 9,000 |
| Methyl benzyl dihydrogenatedtallow | Hectorite | 99.1 | 560 | — | 11,200 |
| Methyl benzyl dihydrogenatedtallow | Hectorite | 99.7 | — | 11,200 | — |
| Methyl benzyl dihydrogenatedtallow | Hectorite | 103.8 | 7,000 | 48,400 | 58,400 |
| Methyl benzyl dihydrogenatedtallow | Hectorite | 104.3 | — | 35,200 | 50,000 |
| Methyl benzyl dihydrogenatedtallow | Hectorite | 106.5 | 6,720 | 48,000 | — |
| Methyl benzyl dihydrogenatedtallow | Hectorite | 108.0 | 2,040 | 49,600 | 64,400 |
| Methyl benzyl dihydrogenatedtallow | Hectorite | 110.5 | 1,040 | 33,000 | 46,800 |
| Methyl benzyl dihydrogenatedtallow | Hectorite | 112.9 | 890 | 44,000 | 67,600 |
| Methyl benzyl dihydrogenatedtallow | Hectorite | 115.0 | 3,400 | 33,600 | 34,800 |
| Methyl benzyl dihydrogenatedtallow | Hectorite | 117.9 | — | 21,000 | — |
| Methyl benzyl dihydrogenatedtallow | Hectorite | 124.9 | — | 13,000 | — |
| Methyl benzyl dihydrogenatedtallow | Bentonite | 91.5 | 400 | 400 | — |
| Methyl benzyl dihydrogenatedtallow | Bentonite | 96.9 | — | 3,200 | — |
| Methyl benzyl dihydrogenatedtallow | Bentonite | 102.6 | 2,880 | 36,800 | 44,000 |
| Methyl benzyl dihydrogenatedtallow | Bentonite | 106.0 | 9,280 | 51,200 | 50,000 |
| Methyl benzyl dihydrogenatedtallow | Bentonite | 111.0 | 20,000 | 30,400 | 25,000 |
| Methyl benzyl dihydrogenatedtallow | Bentonite | 114.4 | — | 15,500 | — |
| Methyl benzyl dihydrogenatedtallow | Bentonite | 120.2 | — | 14,600 | — |
| Methyl benzyl dihydrogenatedtallow | Bentonite | 123.6 | — | 6,800 | — |
| Dimethyl dihydrogenatedtallow | Hectorite | 95.2 | — | 3,400 | — |
| Dimethyl dihydrogenatedtallow | Hectorite | 102.9 | — | 3,400 | — |
| Dimethyl dihydrogenatedtallow | Hectorite | 108.8 | 480 | 12,500 | — |
| Dimethyl dihydrogenatedtallow | Hectorite | 117.0 | 440 | 440 | — |
| Methyl Trihydrogenatedtallow | Hectorite | 95.8 | — | 4,800 | — |
| Methyl Trihydrogenatedtallow | Hectorite | 101.9 | — | 4,400 | — |
| Methyl Trihydrogenatedtallow | Hectorite | 108.5 | 640 | 3,320 | — |
| Methyl Trihydrogenatedtallow | Hectorite | 118.5 | — | 7,400 | — |
| Benzyl Trihydrogenatedtallow | Hectorite | 95.5 | — | 5,000 | — |
| Benzyl Trihydrogenatedtallow | Hectorite | 101.4 | — | 4,800 | — |
| Benzyl Trihydrogenatedtallow | Hectorite | 107.9 | 1,480 | 4,000 | — |
| Benzyl Trihydrogenatedtallow | Hectorite | 119.9 | — | 5,600 | — |
| Dimethyl benzyl hydrogenatedtallow | Hectorite | 117 | — | — | 560 |
| Dimethyl benzyl hydrogenatedtallow | Bentonite | 96.6 | — | 400 | — |
| Dimethyl benzyl hydrogenatedtallow | Bentonite | 101.9 | — | 200 | — |
| Dimethyl benzyl hydrogenatedtallow | Bentonite | 111.1 | — | 400 | — |
| Dimethyl benzyl hydrogenatedtallow | Bentonite | 120.5 | — | 400 | — |
| Methyl benzyl dihydrogenatedtallow | (1) | 111.0 | 8,800 | 41,600 | 42,800 |

(1) 1:1 weight ratio of hectorite and bentonite
(2) — indicates the data was not obtained

EXAMPLE 2

Various types of the organophilic clay gellants prepared in Example 1 were evaluated as grease thickeners at a concentration of 6% by weight in the conventionally refined oil in the presence of 0.1% and 0.3% water. The greases were prepared by mixing the gellant, oil and water together for thirty minutes using a drill press equipped with pitched sweep blades rotating at 450 rpm. The resulting batch was then milled through a Tri-Homo disperser with a rotor to stator clearance of 0.001 inch. The ASTM penetrations of the greases, after setting overnight, were obtained after working the greases 60 and 10,000 strokes in an ASTM motorized grease worker assembly. The data obtained are given in Table B. These gellants were also evaluated in a conventional heated grease preparation process utilizing 4% by weight acetone as a polar organic dispersant for the gellant. The greases were prepared by mixing the gellant, oil and acetone together for 30 minutes, heating to 250° F. with continued mixing to drive off the acetone, cooling to 180° F. and adding 0.1% water with continued mixing, and milling as above. The data obtained for these greases, which are not an illustration of this invention, are compared with the data for the greases in Table B since these greases have the same composition.

The data indicate that the organophilic clays containing an amount of methyl benzyl dihydrogenated tallow ammonium cation in excess of 100 ME per 100 grams of clay were very efficient thickeners for this oil at ambient temperatures using only a small modicum of water as the dispersant. The data also indicates that the organophilic clays having ME ratios in excess of 100 disperse readily in the absence of a polar organic dispersant to produce greases having a penetration ("yield" or viscosity) which is equivalent to that obtained for the greases prepared with the dispersant, whereas at lower ME ratios the organophilic clays produce greases which are definitely inferior to the greases prepared with the dispersant.

TABLE B

| Organophilic Clay | | | Process of This Invention ASTM Penetrations, mm × 10 (2) | | | | Prior Art Process ASTM Penetrations, mm × 10 | |
|---|---|---|---|---|---|---|---|---|
| Quaternary Ammonium Chloride | Clay | ME Ratio | 0.1% Water | | 0.3% Water | | 0.1% Water | |
| | | | 60× | 10,000× | 60× | 10,000× | 60× | 10,000× |
| MB2HT (1) | Hectorite | 87.5 | 440+ | — | 402 | 433 | 345 | 367 |

TABLE B-continued

| Organophilic Clay | | | Process of This Invention ASTM Penetrations, mm × 10 (2) | | | | Prior Art Process ASTM Penetrations, mm × 10 | |
|---|---|---|---|---|---|---|---|---|
| Quaternary Ammonium Chloride | Clay | ME Ratio | 0.1% Water | | 0.3% Water | | 0.1% Water | |
| | | | 60× | 10,000× | 60× | 10,000× | 60× | 10,000× |
| MB2HT | Hectorite | 92.4 | 384 | 417 | 384 | 422 | 329 | 354 |
| MB2HT | Hectorite | 97.2 | 334 | 350 | 320 | 363 | 278 | 304 |
| MB2HT | Hectorite | 99.1 | 309 | 343 | 299 | 345 | 275 | 300 |
| MB2HT | Hectorite | 103.8 | 252 | 285 | 245 | 294 | 245 | 267 |
| MB2HT | Hectorite | 108.0 | 236 | 264 | 214 | 250 | 245 | 265 |
| MB2HT | Hectorite | 112.9 | 262 | 301 | 262 | 321 | 292 | 318 |

(1) Methyl benzyl dihydrogenated tallow
(2) Greases "too thin" to measure have penetrations greater than 440.

EXAMPLE 3

The organophilic clay of Examples 1 and 2 prepared from hectorite reacted with 108 ME/100 grams of clay of methyl benzyl dihydrogenated tallow ammonium chloride was evaluated as a grease gellant in the same manner as in Example 2 except that the concentration of water was varied from 0% to 0.4%. The ASTM penetrations after working the greases 60 and 0,000 strokes were as follows:

0% water—259, 259; 0.1% water—236, 264; 0.2% water—230, 275; 0.3% water—214, 250; 0.4% water—243, 275.

EXAMPLE 4

An organohectorite clay containing 106.8 ME methyl benzyl dihydrogenated tallow ammonium cation and an organobentonite clay containing 102.6 ME methyl benzyl dihydrogenated tallow ammonium cation were evaluated as gellants at a concentration of 5% in the conventionally refined oil in the presence of 0.2% water. These organophilic clays were evaluated in a similar manner in the presence of 2% acetone as a dispersant for the organophilic clays. Thus greases were prepared by mixing the gellant, oil and either water or acetone together for 30 minutes using the drill press as in Example 2, and milling the pre-gels obtained as in Example 2. The greases were evaluated as in Example 2. The data obtained are given in Table C.

The data indicates that the greases prepared containing only 0.2% water had a much lower penetration (higher grease "yield" or viscosity) than the greases containing the polar organic dispersant prepared by the prior art process.

TABLE C

5% Gellant In A Conventionally Refined Oil

| Organophilic Clay Gellant | | | | | ASTM Pene., mm × 10 | |
|---|---|---|---|---|---|---|
| Quaternary Ammonium Cation (1) | Clay | ME Ratio | % Water | % Acetone | 60× | 10,000× |
| MB2HT | Hectorite | 106.8 | 0.2 | 0 | 285 | 321 |
| MB2HT | Hectorite | 106.8 | 0 | 2.0 | 332 | 368 |
| MB2HT | Bentonite | 102.6 | 0.2 | 0 | 300 | 341 |
| MB2HT | Bentonite | 102.6 | 0 | 2.0 | 328 | 362 |

EXAMPLE 5

Various organophilic clays were prepared using the procedures given in Example 1 from sodium bentonite and the indicated ME ratios of methyl benzyl dihydrogenated tallow ammonium chloride. These organophilic clays were evaluated as thickeners for the conventionally refined oil and the solvent refined oil using the procedures given in Example 2. The data obtained are given in Table D.

The data indicates that the preferred concentration of the quaternary ammonium compound is at least 100 milliequivalents and less than 120 milliequivalents per 100 grams of clay.

TABLE D

| Oil | ME Ratio | % Water | ASTM Penetrations, mm × 10 | |
|---|---|---|---|---|
| | | | 60× | 10,000× |
| Conventionally refined | 87.9 | 0 | 373 | 390 |
| Conventionally refined | 96.7 | 0 | 344 | 373 |
| Conventionally refined | 100.3 | 0 | 299 | 345 |
| Conventionally refined | 105.9 | 0 | 275 | 336 |
| Conventionally refined | 114.5 | 0 | 345 | 382 |
| Conventionally refined | 120.3 | 0 | 410 | 415 |
| Solvent refined | 87.9 | 0.3 | 440+ | — |
| Solvent refined | 96.7 | 0.3 | 440+ | — |
| Solvent refined | 100.3 | 0.3 | 358 | 402 |
| Solvent refined | 105.9 | 0.3 | 305 | 342 |
| Solvent refined | 114.5 | 0.3 | 304 | 374 |
| Solvent refined | 120.3 | 0.3 | 347 | 390 |

EXAMPLE 6

The 102.6 ME ratio organobentonite thickener of Example 1 was evaluated as a thickener/suspending agent in an invert emulsion (water-in-oil) drilling fluid at a concentration of 4 pounds per barrel (42 gallons). The drilling fluid had the following composition: 154 parts diesel oil, 129 parts water, 68 parts calcium chloride, 8 parts DURATONE HT, fluid loss control additive, 15 parts INVERMUL emulsifier, and 2 parts E-Z MUL emulsifier. Standard rheology data were obtained on the drilling fluids after mixing with the organophilic clay for 15 minutes with a multimixer. The data obtained are given in Table E. The data indicates that this organophilic clay is an excellent thickener for invert emulsion drilling fluids.

TABLE E

| Organo Bentonite Thickener | Drilling Fluid Rheological Characteristics | | | | | |
|---|---|---|---|---|---|---|
| | Fann Viscosity | | Apparent Viscosity | Yield Point | Gel Strength lb/100ft² | |
| | 600rpm | 300rpm | cp. | lb/100ft² | 10 sec. | 10 min. |
| Example 1, 102.6 ME | 160 | 110 | 80.0 | 60 | 37 | 44 |
| None | 79 | 43 | 39.5 | 7 | 3 | 3 |

The examples indicate the remarkable results achieved utilizing the process of this invention, namely, that the viscosity of liquid organic systems is efficiently increased with an organophilic clay gellant in the absence of a polar organic dispersant for the gellant. Indeed, it is preferred that the viscosity of the organic system obtained by the process of this invention is at least equal to the viscosity which would be obtained if the organic system contained an effective dispersing amount of a polar organic dispersant for the gellant. This can be achieved for any particular organic system by adjusting the ME ratio of the organophilic clay gellant to the optimum value for that system within the range from 100 to less than 120.

We claim:

1. A method of increasing the viscosity of a liquid organic system in the absence of a polar organic dispersant comprising mixing with said liquid organic system an amount sufficient to effect said viscosity increase of an organophilic clay comprising the reaction product of a methyl benzyl dialkyl ammonium compound and a smectite clay having a cation exchange capacity of at least 75 milliequivalents per 100 grams of said clay, wherein said alkyl radicals independently contain from 16 to 18 carbon atoms, and wherein the amount of said ammonium compound is sufficient to impart to the organophilic clay the enhanced dispersion characteristics desired, said amount of the ammonium compound being from 100 to less than 120 milliequivalents per 100 grams of said clay, 100% active clay basis, and from 0% to 1.0% water, wherein no polar organic dispersant for said organophilic clay is added to said organic system.

2. The method of claim 1 wherein said alkyl radicals are hydrogenated tallow radicals.

3. The method of claim 1 wherein there is added from 0.1%–0.15% water.

4. The method of claim 3 wherein said alkyl radicals are hydrogenated tallow radicals.

5. The method of claim 1 wherein the organophilic clay is selected from the group consisting of hectorite and sodium bentonite.

6. A method of increasing the viscosity of a liquid organic system with an organophilic clay in the absence of a polar organic dispersant for said organophilic clay to a value at least equal to the viscosity which would be obtained if said organic system contained a polar organic dispersant for said organophilic clay comprising mixing with said system an amount sufficient to effect said viscosity increase of an organophilic clay comprising the reaction product of a methyl benzyl dialkyl ammonium compound and a smectite clay having a cation exchange capacity of at least 75 milliequivalents per 100 grams of said clay, wherein said alkyl radicals independently contain from 16 to 18 carbon atoms, and wherein the amount of said ammonium compound is from 100 to less than 120 milliequivalents per 100 grams of said clay, 100% active clay basis, and from 0% to 1.0% water.

7. The method of claim 6 wherein said alkyl radicals are hydrogenated tallow radicals.

8. The method of claim 6 wherein there is added from 0.1% to 0.5% water.

9. The method of claim 8 wherein said alkyl radicals are hydrogenated tallow radicals.

10. The method of claim 6 wherein the organophilic clay is selected from the group consisting of hectorite and sodium bentonite.

11. The method of claim 6 wherein the reaction product is a smectite-type clay together with methyl benzyl dihydrogenated tallow ammonium chloride.

12. A method of increasing the viscosity of a liquid organic system which comprises mixing with said liquid organic system a sufficient amount of an organophilic clay to increase the viscosity of the liquid organic system, said organophilic clay comprising the reaction product of methyl benzyl dihydrogenated tallow ammonium chloride and a smectite-type clay selected from the group consisting of hectorite and sodium bentonite, wherein the amount of methyl benzyl dihydrogenated tallow ammonium chloride is from 100 to less than 120 milliequivalents per 100 grams of said clay, 100% active clay basis, and wherein no polar organic dispersant for said organophilic clay is added to said liquid organic system.

* * * * *

UNITED STATES PATENT OFFICE
CERTIFICATE OF CORRECTION

Patent No. 4,287,086  Dated September 1, 1981

Inventor(s) Claude M. Finlayson et al.

It is certified that error appears in the above-identified patent and that said Letters Patent are hereby corrected as shown below:

Column 11 line 32 "0.1%-0.15%"

should read --0.1%-0.5%--.

Signed and Sealed this

First Day of December 1981

[SEAL]

Attest:

Attesting Officer

GERALD J. MOSSINGHOFF

Commissioner of Patents and Trademarks